United States Patent

[11] 3,541,910

| [72] | Inventor | Charles Wesley Murray<br>Franklin Park, Pennsylvania |
|---|---|---|
| [21] | Appl. No. | 756,021 |
| [22] | Filed | Aug. 28, 1968 |
| [45] | Patented | Nov. 24, 1970 |
| [73] | Assignee | Heppenstall Company<br>a corporation of Pennsylvania |

[54] CUTTER KNIVES AND METHODS OF MAKING THE SAME
7 Claims, 2 Drawing Figs.

[52] U.S. Cl. ..................................................... 83/676,
  76/101; 83/698
[51] Int. Cl. ....................................................... B23d 35/00
[50] Field of Search ........................................... 83/676,
  698; 76/101, 101A; 29/471.1

[56] References Cited
UNITED STATES PATENTS

| 3,081,661 | 3/1963 | W. MacPherson .......... | 83/676 |
|---|---|---|---|
| FOREIGN PATENTS | | | |
| 49,633 | 8/1911 | Austria ........................ | 76/101A |
| 929,806 | 6/1961 | Great Britain ................ | 83/698 |
| 156,817 | 8/1932 | Switzerland .................. | 76/101A |
| 232,681 | 6/1944 | Switzerland .................. | 76/101A |

*Primary Examiner*—Andrew R. Juhasz
*Assistant Examiner*—Leon Gilden
*Attorney*—Buell, Blenko & Ziesenheim

ABSTRACT: A composite cutter is provided having an outer annular carbide cutter ring, and a plurality of slightly spaced apart hub segments metallurgically bonded to said cutter ring within said annulus and forming a shaft receiving opening. The hub segments are joined radially by a low temperature bonding compound such as epoxy.

Patented Nov. 24, 1970  3,541,910

INVENTOR
Charles Wesley Murray
his attorneys

CUTTER KNIVES AND METHODS OF MAKING THE SAME

This invention relates to cutter knives and methods of making the same and particularly to a rotary carbide edged cutter having a steel hub and an outer carbide cutter ring.

The manufacture of rotary cutter knives having a steel hub and an outer cutting edge of cemented or sintered carbides such as tungsten carbide has been faced with serious problems of assembly in the past. It is desirable, if not in fact essential, that such knives be provided with a steel hub both to reduce expense and to absorb the driving shock or thrust at the keyway or spline through which the knife is driven. Many methods of assembling a carbide cutter ring on a steel hub have been tried but without complete success. In order to obtain the necessary strength of bond between the hub and carbide cutter, it is necessary to metallurgically bond the cutter and hub by brazing or soldering. Unfortunately, the coefficients of expansion of the steel hub and the carbide ring are so different that the carbide ring and the braze joint are placed under such stress on cooling of the assembly that one or the other or both break. This may happen immediately on cooling or shortly after beginning the use of the knife, both of which are, of course, fatal to use of the knife. Many efforts to overcome this problem have been attempted; for example, the carbide has been attached with resinous adhesives such as epoxies, but the life has been unsatisfactorily short because the resin will not stand up under the high temperature shear stresses which occur in use. Mechanical fasteners have also been attempted, but these too are not satisfactory, both because of the considerable expense involved and the difficulty of holding the carbide and hub in fixed relative positions Other means have been proposed as for example in MacPherson U.S. Pat. No. 3,081,661 in which an annular carbide cutter is attached to a plurality of spaced semiannular segments by brazing and the segments are then attached to a solid hub by means of mechanical fasteners. This structure solves the problem of differential contraction of steel and carbide at their brazed joint but introduces considerable expense in the mechanical connection to the hub and does not entirely solve the problem of holding the hub and outer ring in fixed position.

I have discovered an annular cutter knife structure and method of assembly which solves these problems of the prior art and provides an inexpensive but positive connection between the steel hub and carbide cutter ring.

Preferably, I provide a steel hub assembly in a plurality of semiannular segments, each segment is metallurgically bonded to an annular carbide ring in the interior of the annulus with a slight spacing between each segment and the assembled adjacent segments are then jointed together by a low temperature bonding material such as epoxy resin. The hub is preferably formed in three 120° segments by cutting a preformed hub by sawing with a thin blade such as for example a one-sixteenth inch saw cut. The hub segments are preferably brazed or silver soldered into the annulus of the carbide cutter ring with a uniform spacing between them. This eliminates the braze strain problem. After brazing or soldering and cooling, the hub segments are cemented together with epoxy resin or the like having sufficient bonding and compressive strength to hold the segments in alignment and positioned apart as an integral unit.

In the foregoing general description, I have set out certain objects, purposes and advantages of my invention. Other objects, purposes and advantages of my invention will be apparent from a consideration of the following description and the accompanying drawings in which.

Figure 1:
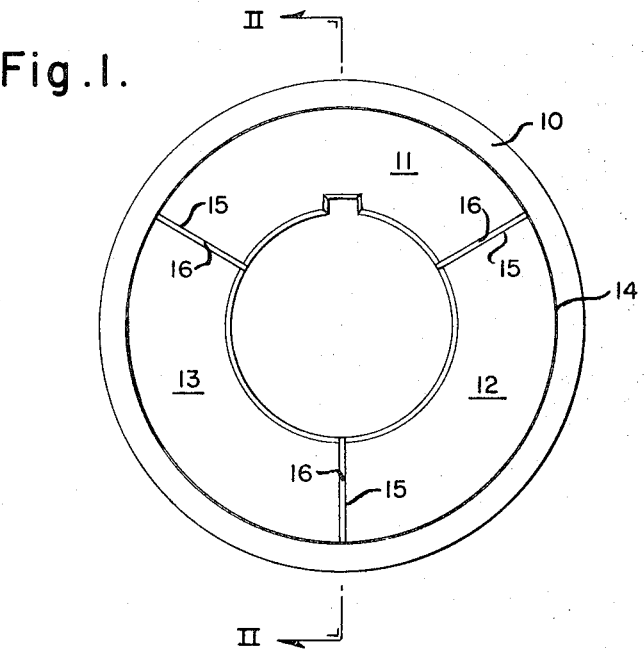
FIG. 1 is a side elevation of a cutter knife according to my invention.
Figure 2:
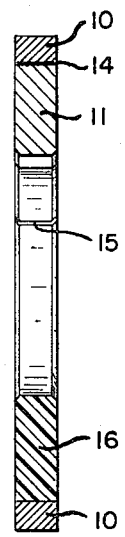
FIG. 2 is a section on the line II–II of FIG. 1.

Referring to the drawings, I have illustrated a cutter knife according to my invention made up of an outer annular carbide cutter ring 10 attached to the three steel hub segments 11, 12 and 13 formed by cutting 120° segments from a preformed solid hub using a saw making a one-sixteenth inch cut. The cutter ring 10 is attached to segments 11, 12 and 13 by braze metal 14. The gap 15 between the segments 11, 12 and 13 is filled with epoxy resin 16 to make an integral assembly. The gap 15 may be left open in some cases and the cutter knife used without filling the gap, however, for most high strength uses the gap should be filled with bonding material to impart rigidity and compressive strength to the segments.

While I have illustrated and described certain preferred practices and embodiments of my invention in the foregoing specification, it will be understood that this invention may be otherwise embodied within the scope of the following claims.

I claim:

1. A composite annular cutter knife comprising an outer carbide annular cutter ring, a plurality of hub segments metallurgically bonded to said cutter ring within the annulus, said hub segments being spaced slightly apart and extending radially inwardly to form a shaft receiving opening and a low temperature bonding material between the hub segments bonding the same into a unitary structure.

2. A cutter knife as claimed in claim 1 wherein the hub segments are substantially 120° segments.

3. A cutter knife as claimed in claim 1 wherein the low temperature bonding material is epoxy resin.

4. A cutter knife as claimed in claim 3 wherein the carbide cutter and hub segments are bonded by brazing.

5. A cutter knife as claimed in claim 3 wherein the carbide cutter and hub segments are bonded by soldering.

6. A method of making a composite cutter knife having an outer carbide cutter ring and a steel hub comprising the steps of:

a. forming an annular carbide cutter ring;
   b. forming a plurality of semiannular hub segments of steel;
   c. metallurgically bonding each of said hub segments within the annulus of the carbide cutter with each segment slightly spaced apart and extending radially inwardly forming a drive shaft receiving portion; and
   d. placing a low temperature bonding material between the hub segments and hardening the same in place to form a unitary hub structure.

7. A method of making a composite cutter as claimed in claim 6 wherein the hub segments are formed by cutting a preformed solid hub radially into a desired number of segments.